May 14, 1935.  W. NANFELDT  2,001,539

BRAKE LINING WITH METALLIC LUBRICATION

Filed July 9, 1931

INVENTOR
WILLIAM NANFELDT

BY   ATTORNEY

Patented May 14, 1935

2,001,539

UNITED STATES PATENT OFFICE 2,001,539

BRAKE LINING WITH METALLIC LUBRICATION

William Nanfeldt, Clifton, N. J., assignor to World Bestos Corporation, Paterson, N. J., a corporation of Delaware Application July 9, 1931, Serial No. 549,795

3 Claims. (Cl. 139—425)

This invention relates to brake lining and especially to brake lining which is formed of a fabric of woven asbestos yarn.

One of the objects of the invention is to provide a brake lining which will have a lubricating effect under high temperatures thereby preventing the material of the brake lining becoming abrasive and hardened.

Another object of the invention is to prevent the formation on the surface of the brake lining of hardened particles of the brake drum.

Other objects of the invention and objects relating particularly to the method of constructing the various elements of the lining will be apparent as the description of the invention proceeds.

One embodiment of the invention has been illustrated in the accompanying drawing in which.

I have found that where brake lining is used upon a steel drum there is a tendency for small particles of the steel to be scraped off the drum due to the abrasiveness of the lining. These particles when they are picked up by the lining apparently tend to become much hotter than the steel of the drum and, therefore, grow harder than the steel of the drum resulting in an increase of the abrasiveness of the lining and the accumulation of more particles upon the lining. These particles even appear to fuse together so that relatively large flakes of steel appear on the surface of the lining and result in uneven wear and scoring of the brake drum. I have found that if a soft metal such as lead have portions uniformly distributed throughout the surface of the lining I can eliminate this deleterious effect.

In my prior filed application Serial No. 533,631, filed April 29, 1931 and entitled "Woven friction lining", I have shown a brake lining which is comprised of several layers or ply of fabric held together with a binder yarn which goes up and down through the fabric at regular spaced intervals thereacross extending over one woof thread of the upper surface and down through the fabric passing under a woof thread of the lower layer. The yarns forming the body of the layers in this application were felted, short fibred asbestos yarns formed of asbestos paper twisted around a core and reinforced with brass wires, while the yarns forming the binders were formed of a plurality of twisted wires for a core and long fibre asbestos cardings twisted around the wires. In the present invention I have found it expedient to introduce a relatively large lead wire into the core of the carded yarn which is then used as a binder holding the several layers of fabric together.

This yarn with its additional lead wire accomplishes the objects of the invention.

Figure 4:
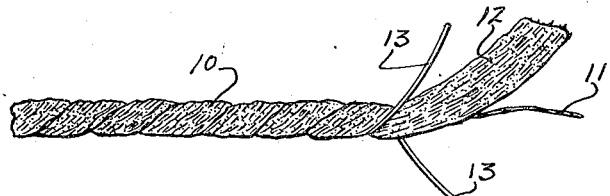
Fig. 4 is an enlarged elevation of a portion of another of the yarns used.

Referring now to the drawing, in Fig. 4 is shown a piece of yarn 10 from which the main body of the brake lining fabric is produced. This yarn comprises a core 11 of thread or string around which is wrapped or formed a paper strip 12 made of asbestos fibres suitably felted together in a paper machine and a pair of brass wires 13 which are wrapped around the asbestos strip to reinforce it. After the wrapping has been accomplished the yarn is further twisted which draws the wires into the softer strip material thereby giving an outer surface of asbestos fibres. The yarns 10 are used as the warp and woof thread of the fabric. Thus the woof threads 14 in the three layers, as shown in Fig. 2, are formed of the felted yarn 10 as are also the warp threads 15.

Figure 3:
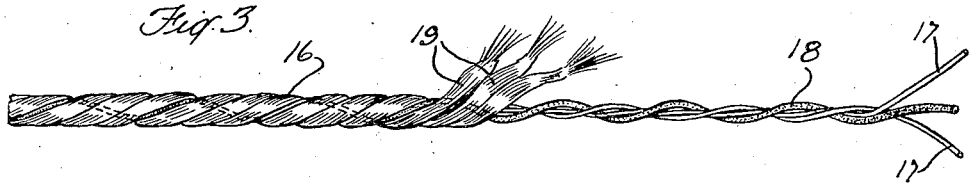
Fig. 3 is an enlarged elevation of a portion of the binder yarn used in the fabric.

The binder yarn illustrated in Fig. 3 may be formed with a core of two brass wires 17 and one lead wire 18 of relatively large diameter twisted together, while twisted around them are a plurality of rovings 19 of long fibre asbestos. In making this yarn long asbestos fibres are properly cleaned and then mixed with about 20% of medium stapled cotton. This material is then carded on a carding machine similar to that used in a process for making woolen yarns. The fibres are placed on the carding machine and formed into rovings of the proper size to form one ply of finished yarn. Next each roving is twisted on a mule to the proper number of twists per inch and about three strands of the twisted rovings are then placed on a twister and twisted together with the wires to form the finished yarn, the wires preferably being the core of the yarn. The twisting of the yarn draws the asbestos fibres in closer to the core wires and permits portions of the core wire to appear on the surface so that at first glance the wire appears to be wrapped around the outside of the asbestos.

Figure 2:
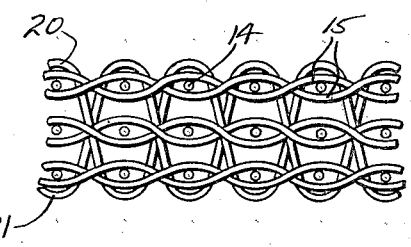
Fig. 2 is a diagrammatic side elevation of the fabric showing the manner of weaving the yarns.

In Fig. 2 one of these binder yarns 20 extends over the top of one of the upper woof threads, down completely through the yarn, passing under one of the woof threads in the lower fabric, and up again through the lining over the top of one of the upper woof threads and so on throughout the length of the brake lining. These binder yarns are spaced in pairs all the way across the lining and the yarn 21 in Fig. 2 is placed adjacent the yarn 20 and extends upwardly while the yarn 20 passes downwardly and vice versa through the length of the fabric as will be understood so that the three layers are firmly bound together.

Figure 1:
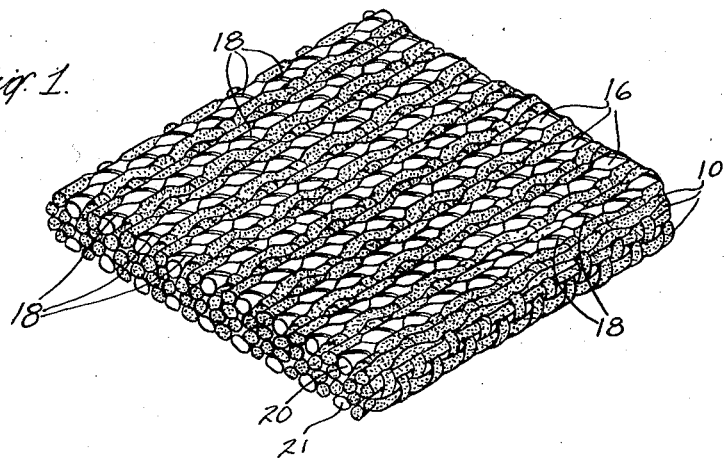
Fig. 1 is a perspective view of a portion of brake lining fabric embodying the invention.

As will be seen from Fig. 1 portions of the lead wire 18 are exposed in an even distribution throughout the surface of the brake lining. The result of this distribution of lead upon the surface of the lining is that extreme heat causes the lead to melt and lubricate the lining thereby preventing particles of the drum from being torn up by the abrasive action of the lining and preventing the surface of the lining from becoming hardened and abrasive. This action of the lead has particular importance in connection with the brass of the yarn support wires since the brass has a scoring hardness of 3 according to the Mohs' scale, whereas when combined with lead having a hardness of 1 the resultant hardness is below 3.

After the lining is woven it may be impregnated with any desirable compound for increasing the friction and lubrication thereof and it may be then baked, calendered or otherwise treated in accordance with well known practices.

It should be noted that by introducing the wire into the core of the yarn there is not only an even distribution of exposed lead across the surface of the brake lining but such lead is firmly held in position by the material impregnated in the yarn and is not easily torn away from the lining. This is an advantage due to the weakness of the lead wire and its tendency if not so protected is to be destroyed under the extreme frictional stresses developed. The effect of the improved brake lining is to give a good smooth frictional resistance to the rotation of the brake drum even under extreme braking pressures where high heat is developed and the brake lining thereby lasts much longer and gives an even service during its life.

Many modifications of the invention may be resorted to without departing from the spirit thereof and I do not, therefore, desire to limit myself to what has been shown and described except as such limitations occur in the appended claims.

What I desire to claim and secure by Letters Patent is:

1. In a brake lining a plurality of layers of fabric composed of warp and woof threads, said threads being formed of felted short fibred asbestos yarn containing supporting filaments, and a plurality of binder threads positioned at spaced intervals across the lining and woven longitudinally of said lining over at least one of the woof threads in the uppermost layer down through the lining and under at least one of the woof threads in the lowermost layer and up again through the lining and over an adjacent woof thread of the uppermost lining, said binder threads being formed of long fibred asbestos yarn containing a lead wire.

2. In a brake lining a plurality of layers of fabric formed of warp and woof threads of felted short fibred asbestos yarn containing wire supporting filaments, and a plurality of binder yarns in spaced position across said fabric and woven longitudinally of said lining, passing over a woof thread in the upper layer, down through the lining, under a woof thread in the lowermost layer, up through the lining again and continuing this weave throughout the length of the lining, said binder yarn comprising carded long fibred asbestos yarn containing lead and brass wires.

3. In a brake lining a plurality of layers of fabric formed of warp and woof yarns of felted short fibred asbestos and supporting filaments, and a plurality of binder yarns in spaced position across said fabric and woven longitudinally of said lining, passing over a woof thread in the upper layer, down through the lining, under a woof thread in the lowermost layer, up through the lining again and continuing this weave throughout the length of the lining, an impregnant, said binder yarn comprising carded and absorbent asbestos yarn containing cotton, lead and brass strands whereby the impregnating fluid is carried throughout the body of the brake lining and the abrasive effect of the brass wire is diminished.

WILLIAM NANFELDT.